US 9,995,243 B2

(12) United States Patent
Kondo et al.

(10) Patent No.: US 9,995,243 B2
(45) Date of Patent: Jun. 12, 2018

(54) ENGINE COVER

(71) Applicants: SUMITOMO RIKO COMPANY LIMITED, Komaki-shi, Aichi (JP); TOKAI CHEMICAL INDUSTRIES LTD., Kani-gun, Gifu (JP)

(72) Inventors: Hiroyuki Kondo, Gifu (JP); Kimio Ishii, Kasugai (JP)

(73) Assignees: SUMITOMO RIKO COMPANY LIMITED, Komaki-shi (JP); TOKAI CHEMICAL INDUSTRIES, LTD., Kani-gun (JP)

( * ) Notice: Subject to any disclaimer, the term of this patent is extended or adjusted under 35 U.S.C. 154(b) by 73 days.

(21) Appl. No.: 14/974,717

(22) Filed: Dec. 18, 2015

(65) Prior Publication Data
US 2016/0102630 A1    Apr. 14, 2016

Related U.S. Application Data

(63) Continuation of application No. PCT/JP2014/068351, filed on Jul. 9, 2014.

(51) Int. Cl.
*F02F 7/00* (2006.01)
*B60R 13/08* (2006.01)
*F02B 77/13* (2006.01)

(52) U.S. Cl.
CPC .......... *F02F 7/006* (2013.01); *B60R 13/0838* (2013.01); *F02B 77/13* (2013.01)

(58) Field of Classification Search
CPC .. B60R 13/0838; F16B 5/0621; F02F 7/0085; F02F 7/006; F02B 77/11

USPC .......................................... 403/135; 123/198
See application file for complete search history.

(56) References Cited

U.S. PATENT DOCUMENTS

| RE31,635 | E | * | 7/1984 | Smith | F16C 11/069 403/122 |
| 5,235,938 | A | * | 8/1993 | Haussmann | F01M 13/00 123/184.21 |
| 6,206,604 | B1 | * | 3/2001 | Dembowsky | F16B 21/075 403/122 |

(Continued)

FOREIGN PATENT DOCUMENTS

| JP | 2005-153809 A | * | 6/2005 |
| JP | 2005-153809 A |  | 6/2005 |

(Continued)

OTHER PUBLICATIONS

Oct. 7, 2014 International Search Report issued in International Patent Application No. PCT/JP2014/068351.

(Continued)

*Primary Examiner* — Stephen K Cronin
*Assistant Examiner* — Kody Kight
(74) *Attorney, Agent, or Firm* — Oliff PLC

(57) ABSTRACT

An engine cover for covering an engine including: a cover body configured to cover the engine from above; and at least one fixing part projecting from the cover body toward an engine side and being configured to be attached to the engine side, wherein the cover body and the fixing part are integrally formed of an urethane foam, and the fixing part has an infirm portion formed at a periphery thereof so that the fixing part is configured to be deformed toward a specific direction due to the infirm portion upon input of a load to the cover body.

4 Claims, 5 Drawing Sheets

(56) References Cited

U.S. PATENT DOCUMENTS

| | | | | |
|---|---|---|---|---|
| 7,004,665 | B2* | 2/2006 | Wasylewski | F16C 11/0638 403/122 |
| 7,082,919 | B2* | 8/2006 | Nonogaki | F02F 7/006 123/198 E |
| 7,275,513 | B2* | 10/2007 | Nonogaki | F02F 7/006 123/195 C |
| 7,322,768 | B2* | 1/2008 | Ochiai | F16B 21/073 403/122 |
| 7,547,061 | B2* | 6/2009 | Horimatsu | B60R 13/0206 296/187.01 |
| 8,397,691 | B2* | 3/2013 | Osawa | B25F 5/02 123/195 C |
| 8,585,340 | B2* | 11/2013 | Schmitz | B60R 21/34 411/298 |
| 9,327,637 | B2* | 5/2016 | Kondo | B60Q 1/0483 |
| 9,458,868 | B2* | 10/2016 | Metten | B29C 45/16 |
| 2002/0170775 | A1* | 11/2002 | Stein | B29C 45/14467 181/204 |
| 2005/0217634 | A1* | 10/2005 | Nonogaki | F02F 7/006 123/198 E |
| 2006/0073310 | A1* | 4/2006 | Winkler | F02B 77/13 428/158 |
| 2006/0125286 | A1* | 6/2006 | Horimatsu | B60R 13/0206 296/187.03 |

FOREIGN PATENT DOCUMENTS

| | | |
|---|---|---|
| JP | 2006331539 A * | 12/2006 |
| JP | 2011-094547 A | 5/2011 |
| JP | 2012-166639 A | 9/2012 |
| JP | 2014-055529 A | 3/2014 |

OTHER PUBLICATIONS

Jan. 10, 2017 International Preliminary Report on Patentability issued in International Patent Application No. PCT/JP2014/068351.

* cited by examiner

ENGINE COVER

INCORPORATED BY REFERENCE

This is a Continuation of International Application No. PCT/JP2014/068351 filed on Jul. 9, 2014, the disclosure of which including the specification, drawings and abstract is incorporated herein by reference in its entirety.

BACKGROUND OF THE INVENTION

1. Field of the Invention

The present invention relates to an engine cover configured to cover an engine from above in an engine compartment covered by a bonnet.

2. Description of the Related Art

Engine covers have sometimes been adopted for the purposes such as reducing engine emission noise in automobiles, for example. An engine cover is formed of synthetic resin or the like, and comprises a cover body to cover an engine from above and a fixing part projecting toward the engine side by which the engine cover is attached to a top surface of the engine. This engine cover is disposed between the engine and a bonnet in an engine compartment.

In the meantime, the engine cover disposed between the bonnet and the engine is required to have shock-absorbing function to protect pedestrians or the like on a clash. Therefore, in U.S. Pat. No. 7,082,919, a fixing part of an engine cover relative to an engine is configured to be broken on input of an impact load to displace a cover body such that it sinks in toward the engine side, thereby decreasing the load applied to clashed pedestrians or the like.

However, if the bonnet gets attached to the cover body, so that the cover body deforms to approach the engine, the cover body may get into contact with vehicle parts in the engine compartment. It means that providing a large clearance is required to avoid the contact. Especially, avoiding damaged fuel system vehicle parts (a fuel pipe, etc.) and electric system vehicle parts (a wire harness, etc.) due to the contact of the cover body requires enough space, leading to a problem of difficulty in compacting.

SUMMARY OF THE INVENTION

The present invention has been developed in view of the above-described matters as the background, and it is an object of the present invention to provide an engine cover with a novel structure which is able to obtain a shock-absorbing function on a clash and avoid a contact with vehicle parts with a small space.

The above and/or optional objects of this invention may be attained according to at least one of the following modes of the invention. The following modes and/or elements employed in each mode of the invention may be adopted at any possible optional combinations.

A first mode of the present invention provides an engine cover for covering an engine comprising: a cover body configured to cover the engine from above; and at least one fixing part projecting from the cover body toward an engine side and being configured to be attached to the engine side, wherein the cover body and the fixing part are integrally formed of an urethane foam, and the fixing part has an infirm portion formed at a periphery thereof so that the fixing part is configured to be deformed toward a specific direction due to the infirm portion upon input of a load to the cover body.

In the engine cover constructed according to the first mode of the present invention, the infirm portion formed in the fixing part determines the direction in which the fixing part deforms upon the load input to the cover body. In other words, the fixing part is likely to collapse or bend toward the peripheral side having the infirm portion. This controls the displacement of the fixing part and the cover body in relation to the load input due to a pedestrian's collision etc., thereby avoiding the engine cover from getting into contact with vehicle parts or the like.

Moreover, the cover body and the fixing part are soft components made of the urethane foam. Accordingly, if a pedestrian or the like collides with a bonnet and the bonnet deforms or displaces to get into contact with the cover body, it can avoid the impact force applied to the pedestrian etc. from being larger due to engine cover's rigidity. Therefore, it is possible to shorten the distance between the bonnet and the cover body and to adopt the engine cover without requiring a large space for providing it in the engine compartment.

In addition, the infirm portion will reduce the deformation rigidity of the fixing part, thereby further reducing the impact force applied to a pedestrian etc. who collided with the bonnet. Furthermore, since the cover body and the fixing part are made of the urethane foam with flexibility, elasticity, and excellent attenuation performance, it is possible to amply decrease the initial impact force of a collision with the pedestrian or the like, while absorbing the collision energy owing to energy attenuation action accompanying the deformation of the engine cover.

A second mode of the present invention provides the engine cover according to the first mode, wherein the infirm portion comprises a lightening recess open in a peripheral face of the fixing part at a part of the periphery of the fixing part.

According to the second mode, the lightening recess open to the peripheral face of the fixing part causes the fixing part to deform as folded to the opening side of the lightening recess upon a compressive load input on the fixing part in the direction of its projection. This makes it possible to deform the cover body and the fixing part in a specific direction. Moreover, the infirm portion can be easily provided by forming a lightening recess and varying the configuration of the fixing part at the periphery.

A third mode of the present invention provides the engine cover according to the second mode, wherein the lightening recess of the fixing part is open to a counter side around the fixing part with respect to a portion where at least one of fuel system vehicle parts and electric system vehicle parts are disposed.

According to the third mode, the fuel system vehicle parts or the electric system vehicle parts are disposed at the side of the fixing part opposite to the direction in which the lightening recess opens, thereby avoiding a contact of deformed fixing part in relation to the fuel system vehicle parts or the electric system vehicle parts, even if the fixing part deforms as folded at the opening of the lightening recess. In addition, the deformation of the fixing part like being bended at the opening of the lightening recess causes a moment in a specific direction relative to the cover body, which facilitates deformation of the cover body to separate from the engine side at the peripheral side of the fixing part opposite to of the opening of the lightening recess. It means the cover body becomes unlikely to touch the fuel system vehicle parts or the electric system vehicle parts. Therefore, it is possible to avoid the fuel system vehicle parts or the electric system vehicle parts from being damaged by a contact with the engine cover to avert dangers caused by leakage of fuel or electricity.

A fourth mode of the present invention provides the engine cover according to any one of the first through third modes, wherein the at least one fixing part comprises a plurality of fixing parts each having the infirm portion, and the plurality of fixing parts are configured to be deformed toward a same direction induced by the infirm portions.

According to the fourth mode, the deformation of each fixing part due to a load input to the engine side makes the cover body displace to the engine side while displacing in the specific direction orthogonal to the load input direction. Therefore, the cover body becomes unlikely to get into contact with the vehicle parts disposed at the engine side to avoid damages on the vehicle parts. Meanwhile, since the cover body becomes unlikely to get into contact with the engine side, the shock-absorbing action caused by the deformation of the engine cover is effectively exerted with a large stroke.

A fifth mode of the present invention provides the engine cover according to the fourth mode, wherein at least two of the plurality of fixing parts each having the infirm portion have mutually different deformation stiffness values.

According to the fifth mode, the fixing parts with different deformation stiffness values deform in mutually different ways, thereby exerting even more excellent shock-absorbing action to alleviate the impact force which acts on a clashed pedestrian etc. Since the fixing parts with different deformation stiffness values deform in a step-by-step manner, the shock-absorbing action in the initial phase of a collision is advantageously improved while a contact of the cover body relative to the engine side is favorably avoided. On the other hand, if the fixing parts with different deformation stiffness values are made to deform at the same time in relation to an envisioned input, the shock-absorbing action which accompanies the deformation of the whole engine cover can decrease the impact force acting on a clashed pedestrian etc. effectively.

A sixth mode of the present invention provides the engine cover according to any one of the first through fifth modes, wherein the fixing part includes an elastic engaging member bonded thereto and made of urethane elastomers, and the elastic engaging member is configured to be engaged with an engaging element provided on the engine side so that the fixing part is attached to the engine side.

According to the sixth mode, by engaging the elastic engaging member bonded to the fixing part with the engaging element on the engine side, the engine cover is fixed to the engine side with enough durability and stability of the fixed state. Also, by being made of urethane elastomers, the elastic engaging member can be easily and firmly fixed to the fixing part formed from the urethane foam.

According to the present invention, by adopting flexible cover body and fixing part formed of an urethane foam, the attenuation action accompanying the deformation of the cover body and the fixing part decreases the impact force acted on a pedestrian or the like who ran into the bonnet. Furthermore, owing to the fixing part being provided with an infirm portion to determine the deformation direction of the fixing part in relation to a load input, a contact of the cover body and the fixing part with the vehicle parts upon the load input is easily avoided to prevent damages on the vehicle parts.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
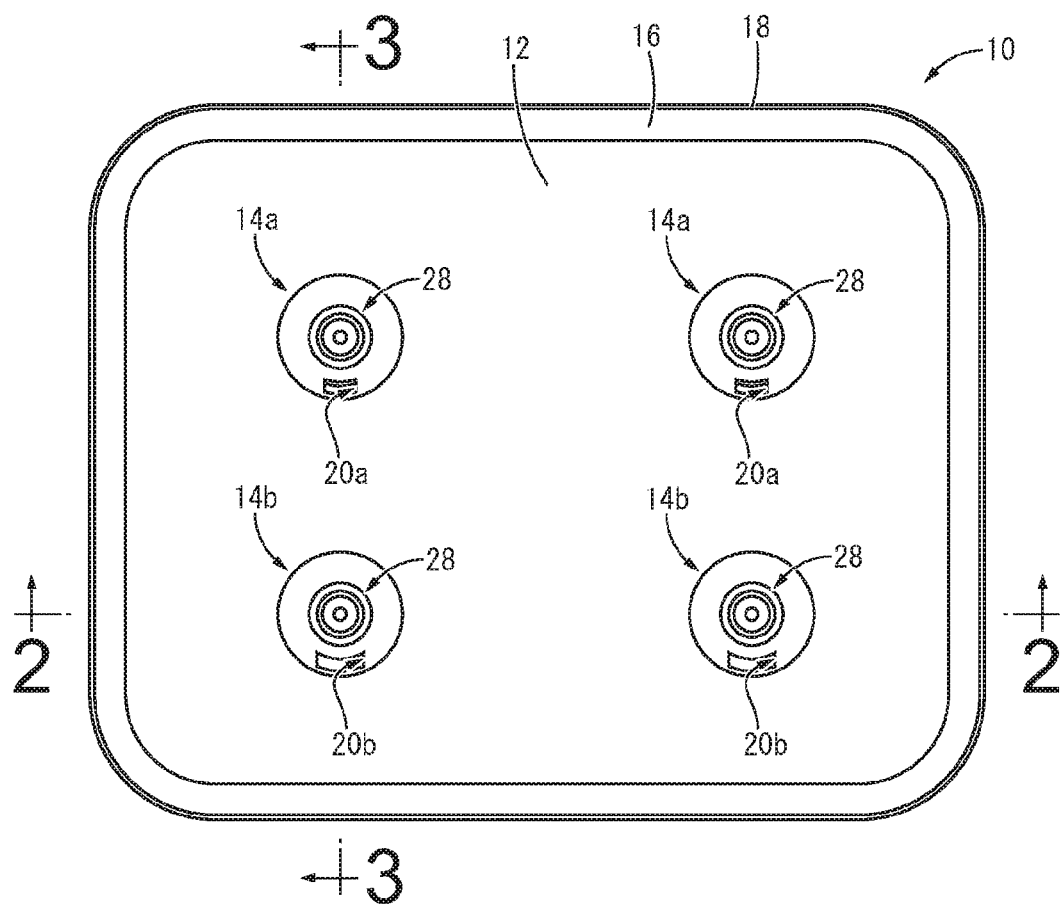
FIG. 1 is a bottom view showing an engine cover as a first embodiment of the present invention.
Figure 2:
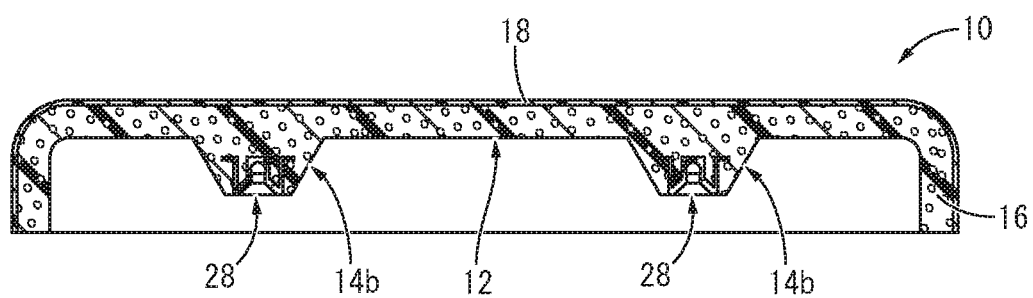
FIG. 2 is a cross sectional view taken along line 2-2 of FIG. 1.
Figure 3:
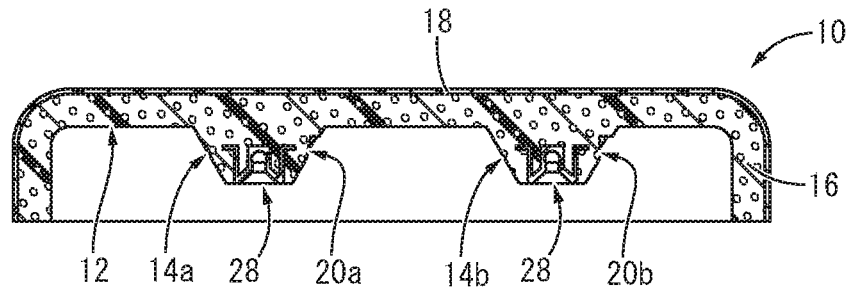
FIG. 3 is a cross sectional view taken along line 3-3 of FIG. 1.

FIGS. 1 to 3 show an engine cover 10 as a first embodiment of the present invention. The engine cover 10 has a structure wherein a cover body 12 is integrally provided with four fixing parts 14a, 14a, 14b, 14b. In the following descriptions, the up-down direction means the up-down direction of FIG. 2, which is substantially the vertical direction in a state of the engine cover being mounted to the vehicle. The front-back direction means the left-right direction of FIG. 3, which is substantially the front-back direction of the vehicle in the same state. The left-right direction means the left-right direction of FIG. 2, which is substantially the left-right direction of the vehicle in the same state.

In more details, the cover body 12 has a plate form which expands in the front-back direction and in the left-right direction. By being formed of a semi-rigid urethane foam, the cover body 12 is light and has some rigidity and excellent impact absorbing force (high attenuation characteristics). Although adopting a closed-cell type urethane foam for the cover body 12 makes it easier to obtain the required rigidity and attenuation performance, it is also possible to use an open-cell type one or an urethane foam including closed cells and open cells in a mixed state. The cover body 12 of the present embodiment has a substantially rectangular shape with round corners in plan view. It has a reinforcing rib 16 formed integrally and continuously along all the circumference to project downward on its outer peripheral edge part.

The urethane foam to form the cover body 12 can be obtained, for example when synthesizing a polyurethane, by making the polyurethane foam using a gas generated as a result of a reaction of glycol component and diisocyanate component induced by water. Furthermore, to realize the prescribed expansion ration and foaming mode, it is possible to add a foaming agent or an agent for making uniform foam cells. As the urethane foam to form the cover body 12, either a polyether-based one or a polyester-based one can be used. To effectively attain the attenuation action upon a collision described later, the density of the urethane foam is made 0.08 to 0.15 g/cm$^3$.

Moreover, a coating layer 18 is formed on the surface (the upper face and the outer peripheral face) of the cover body 12. The coating layer 18 is a thin outer coat made of an urethane paint covering an underfill portion on the surface of the cover body 12. The coating layer 18 is formed of a non-foaming urethane or an urethane foam whose expansion ratio is extremely small relative to that of the cover body 12, thereby having a smoother surface than the cover body 12.

The four fixing parts 14a, 14a, 14b, 14b are provided on the lower face of the cover body 12. Each fixing part 14a/14b is formed of the same urethane foam as the cover body 12 integrally therewith. As shown in FIGS. 1 to 4, each has an inverted substantially truncated cone form projecting downward from the cover body 12 in a tapered shape.

Figure 4:
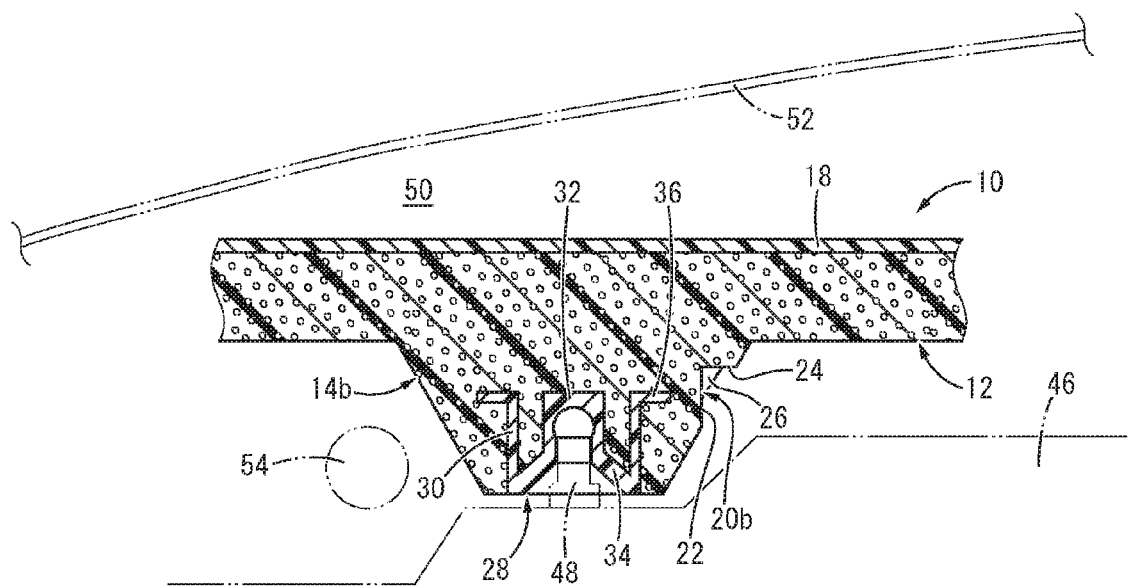
FIG. 4 is a fragmentary enlarged view of a principal part of the engine cover of FIG. 3.

Additionally, each fixing part 14a/14b includes a lightening recess 20a/20b provided as an infirm portion. The lightening recess 20a/20b is a recess in a shape of a notch open in the peripheral face of the fixing part 14a/14b provided at a part of the periphery of the fixing part 14a/14b as shown in FIG. 1. The inner face of the lightening recess 20a/20b of this embodiment comprises a circumferential wall inner surface 22, an upper wall inner surface 24, and a pair of edge wall inner surfaces 26, 26 as shown in FIG. 4. The upper wall inner surface 24 expands in substantially a horizontal direction orthogonal to the up-down direction.

Moreover, in this embodiment, each of the four fixing parts 14a, 14a, 14b, 14b has the lightening recess 20a/20b, with the lightening recess 20a/20b each opening to the back side of the vehicle. Furthermore, the shapes of the lightening recesses are made mutually different between the lightening recesses 20a, 20a provided for the two fixing parts 14a, 14a to be positioned on the front side of the vehicle and the lightening recesses 20b, 20b provided for the two fixing parts 14b, 14b to be positioned on the back side of the vehicle in a state of the engine cover being mounted to the vehicle described later. Specifically, in the lightening recess 20a, both the circumferential length and the slope angle of the circumferential wall inner surface 22 relative to the peripheral face of the fixing part 14a are made smaller than those of the lightening recess 20b. In other words, the lightening recess 20a is made narrower in the circumferential direction of the fixing part 14a/14b and shallower in the radial direction than the lightening recess 20b. This makes a mutual difference in the deformation stiffness values between the fixing parts 14a provided with the lightening recesses 20a on the front side of the vehicle and the fixing parts 14b provided with the lightening recesses 20b on the back side of the vehicle. In the present embodiment, the deformation stiffness value of the fixing part 14a is larger than that of the fixing part 14b.

Also, elastic engaging members 28 are attached on the projecting distal ends of the fixing parts 14a, 14b. The elastic engaging member 28 is made of urethane elastomers and is a solid of revolution having a cross-sectional shape shown in FIG. 4. More specifically, the elastic engaging member 28 comprises an outer circumferential bonding portion 30 substantially in a circular cylinder shape, a center fitting portion 32 in an inverted substantially bottomed circular cylinder shape, and a middle guiding portion 34 in a tapered shape gradually increasing its diameter downward. The elastic engaging member 28 has a structure with the three portions integrally formed, wherein the outer circumferential bonding portion 30 and the center fitting portion 32 are positioned such that the center fitting portion 32 is on the inner peripheral side of the outer circumferential bonding portion 30 and the lower ends of the two portions are connected to each other by the middle guiding portion 34. In addition, a flange 36 is integrally provided on the upper end of the outer circumferential bonding portion 30. The flange 36 has a shape of an annular plate expanding to the outer peripheral side.

The elastic engaging members 28 are bonded to the lower ends of the fixing parts 14a, 14b in a buried state with only the lower faces exposed. It makes the center holes of the center fitting portions 32 open to the lower faces of the fixing parts 14a, 14b. The elastic engaging members 28 are made such that they can be bonded to the fixing parts 14a, 14b without requiring a special bonding step in forming the fixing parts 14a, 14b. A manufacturing method of the engine cover 10 will be described below.

Figure 5A:
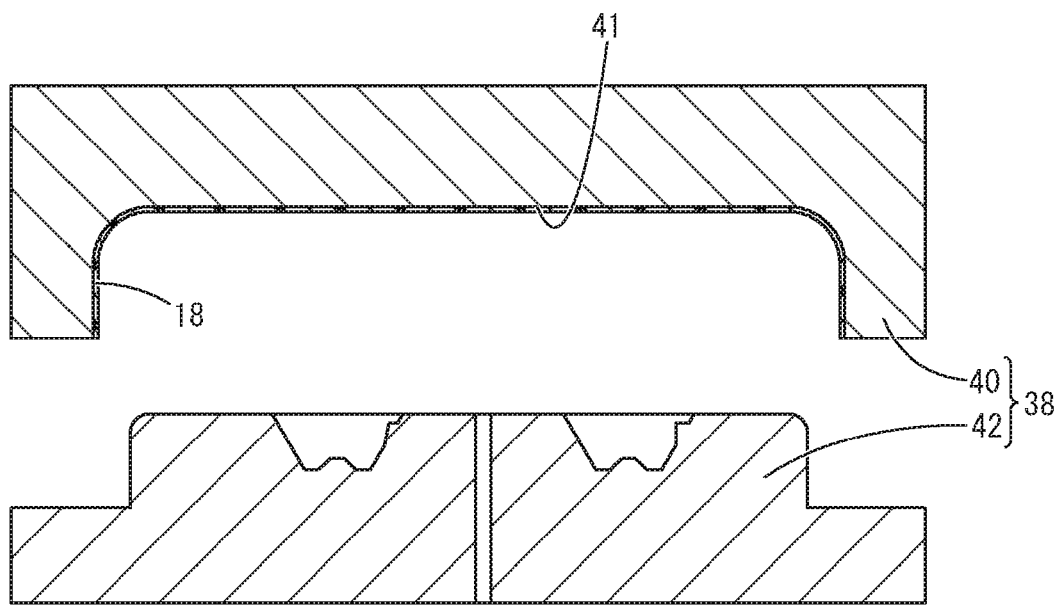
FIGS. 5A and 5B are suitable views for explaining the manufacturing steps of the engine cover of FIG. 3, wherein FIG. 5A indicates the step of forming a coating layer, and FIG. 5B indicates the preparation step for molding a cover body and a fixing parts, respectively.

First, as depicted in FIG. 5A, a cavity inner surface 41 of an upper mold half 40 constituting a mold 38 is covered with the coating layer 18 using the urethane paint, which completes the step of molding the coating layer 18. The coating layer 18 can be formed by spraying the urethane paint to the cavity inner surface 41 of the upper mold half 40 by the prescribed thickness using a sprayer etc. and hardening it, for example.

Figure 5B:
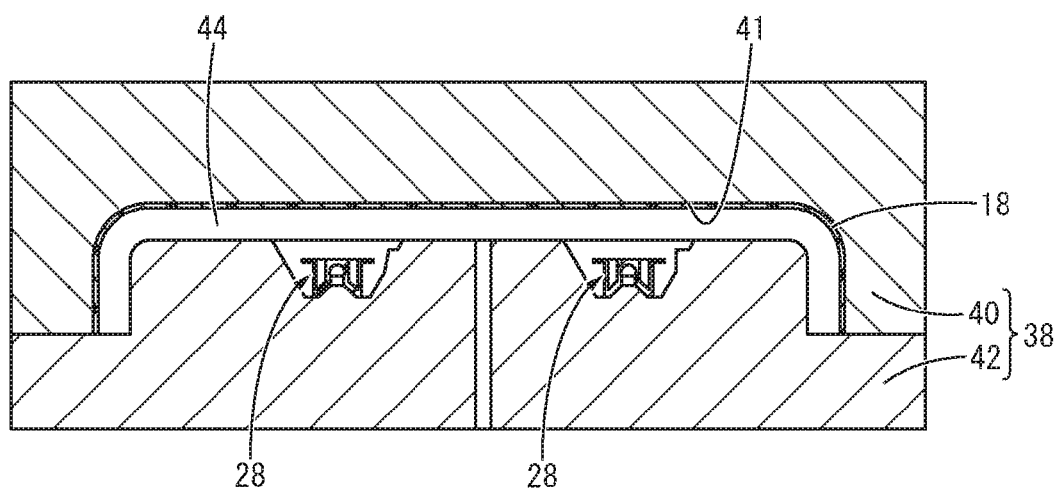

Next, the upper mold half 40 having the coating layer 18 on the cavity inner surface 41 and a lower mold half 42 set with the elastic engaging members 28 prepared in advance are assembled one above the other and the mold assembly is locked. After forming the mold 38 as shown in FIG. 5B, the cover body 12 and the fixing parts 14a, 14b made of the urethane foam are molded by the injection foam molding method in which the forming material (liquid material) of the cover body 12 and the fixing parts 14a, 14b is injected into a cavity 44 of the mold 38 to expand. This finishes not only the step of molding the cover body 12 and the fixing parts 14a, 14b but also the step of bonding the coating layer 18 to the cover body 12 and bonding the elastic engaging members 28 to the fixing parts 14a, 14b, which means the completion of the steps of manufacturing the engine cover 10.

In the present embodiment, since both the coating layer 18 and the elastic engaging members 28 are made of urethane materials, they have a high affinity with the cover body 12 and the fixing parts 14a, 14b made of the urethane foam. Accordingly, they are attached firmly to the cover body 12 and the fixing parts 14a, 14b without requiring application of a special adhesive and the like.

The engine cover 10 with such a structure is mounted to the vehicle as shown in FIG. 4. Specifically, engaging projections 48 provided as engaging elements on the engine side to project on the upper face of an engine 46 are fitted into and engaged with the elastic engaging members 28 provided in the fixing parts 14a, 14b of the engine cover 10, thereby attaching the fixing parts 14a, 14b to the side of the engine 46, so that the cover body 12 is supported to cover the engine 46 from above. In this embodiment, the elastic engaging members 28 formed of non-foaming urethane elastomers are engaged with the engaging projections 48 on the engine side, thereby improving the durability and the stability in a mounted state in comparison with the case wherein each fixing part 14a/14b formed of the urethane foam is engaged directly with the engaging projection 48 and attached thereto.

In addition, the engine cover 10 is housed in an engine compartment 50 and covered by a bonnet 52 from above. The bonnet 52 and the engine cover 10 are disposed one above the other with the predetermined distance in between. As a result, the sound emitted from the engine 46 is absorbed by the engine cover 10 to reduce the transmission to the bonnet 52. Especially since both the cover body 12 and the fixing parts 14a, 14b are made of the urethane foam, the engine cover 10 of this embodiment prevents sound transmission more effectively. Although FIG. 4 shows only one fixing part 14b being enlarged, four fixing parts 14a, 14a, 14b, 14b are each fixed to the engine 46 in the same way and the engine cover 10 is supported by the engine 46 at four points.

Furthermore, there is a fuel pipe 54 as one of the fuel system vehicle parts is disposed extending in the left-right direction on the front side of the fixing parts 14b on the back side of the vehicle. The fuel pipe 54 is provided on the counter side to the direction of formation of the lightening recesses 20b on the circumference of the fixing parts 14b on the back side of the vehicle, while being disposed closer to the fixing parts 14b on the back side of the vehicle than to the fixing parts 14a of the front side of the vehicle.

Figure 6:
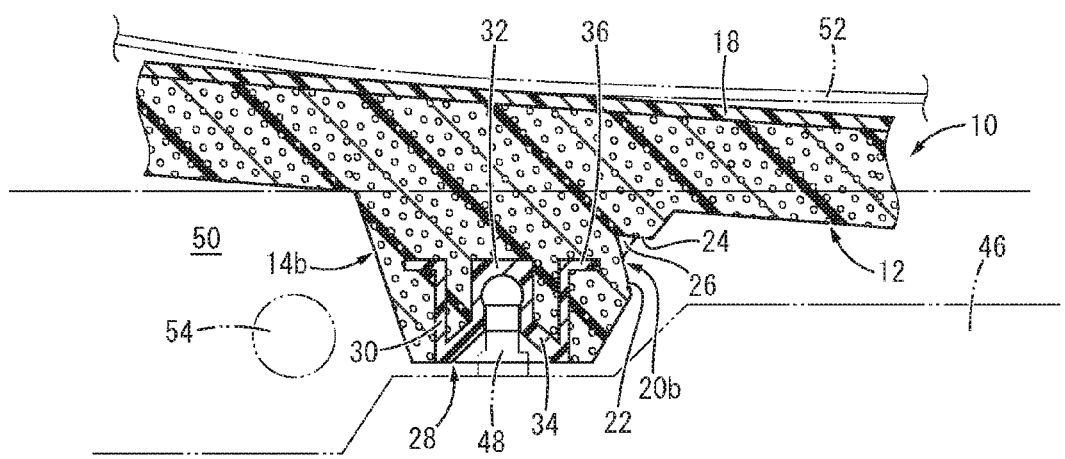
FIG. 6 is a cross sectional view showing the deformed state of the principal part of the engine cover of FIG. 4 due to a collision load input on a bonnet.

In such a mounted state to the vehicle, a collision of a pedestrian etc. with the bonnet 52 causes the bonnet 52 to deform as it sinks, as shown in FIG. 6, to get into contact with the upper face of the cover body 12 of the engine cover 10, leading to a load input downward on the cover body 12. This applies the compression force to each fixing part 14a/14b in the up-down direction between the bonnet 52 and the engine 46 via the cover body 12.

Here, each the fixing part 14a/14b has the lightening recess 20a/20b formed to open to the back side of the vehicle. As shown in FIG. 6, a large compression force is exerted on the fixing part 14a/14b in the axial direction, thereby deforming the fixing part 14a/14b such that a portion on the opening side of the lightening recess 20a/20b is folded into a valley shape, so that the upper portion of the fixing part 14a/14b relative to the lightening recess 20a/20b is tilted in relation to the fixing face of the fixing part 14a/14b to the engine 46 toward the specific direction (the back side of the vehicle). Due to this deformation of the fixing part 14a/14b, the cover body 12 displaces downward on the vehicle back side of the fixing part 14a/14b while displacing upward on the vehicle front side of the fixing part 14a/14b. As a result, the upper portion of the fixing part 14a/14b and the cover body 12 are prevented from getting into contact with the fuel pipe 54 disposed on the front side of the vehicle relative to the fixing part 14a/14b, thereby averting a fuel leakage etc. caused by damages on the fuel pipe 54. To make the tilting of the cover body 12 more seeable, a dot-and-dash line extending horizontally is shown in FIG. 6.

In this embodiment, the fuel pipe 54 is shown as an example of the vehicle parts to be prevented from touching the cover body 12. In fact, it is desirable to prevent a contact of the cover body 12 with not only the fuel system vehicle parts like the fuel pipe 54 including a fuel flowing or being stored, but also the electric system vehicle parts like a wire harness which are electrically connected to and communicated with a power source such as an in-vehicle battery. It is because damages of the fuel system vehicle parts or the electric system vehicle parts due to a contact with the cover body 12 may give rise to dangers such as a fire caused by a leakage of fuel or electricity.

Additionally, owing to the initial deformation mode of the fixing parts 14a, 14b being induced to be like that of FIG. 6 by the lightening recesses 20a, 20b, even in the case of a considerably large load input, the fixing parts 14a, 14b are easily deformed to collapse to the back side of the vehicle, causing the displacement of the cover body 12 diagonally downward which is accompanied with a slide to the back side of the vehicle. Especially, since the input direction of the impact load on the bonnet 52 generally tilts to the vehicle back side, the fixing parts 14a, 14b are likely to deform to collapse to the back side of the vehicle. This can secures a large stroke up to a contact of the cover body 12 with the vehicle parts including the fuel pipe 54, enabling to prevent a contact of the cover body 12 from damaging the vehicle parts favorably with a smaller space.

Especially in the present embodiment, the respective lightening recess 20a/20b provided in each the four fixing parts 14a, 14a, 14b, 14b opens to the back side of the vehicle. As a result, each fixing part 14a/14b is likely to deform to the back side of the vehicle. The cover body 12 displaces downward sliding to the back side of the vehicle, thereby making it difficult for the cover body 12 to touch the vehicle parts such as the fuel pipe 54.

Also, the cover body 12 and the whole fixing parts 14a, 14b of the engine cover 10 are formed of the urethane foam which has flexibility and excellent impact-absorbing force. By so doing, even if the bonnet 52 and the engine cover 10 are disposed close to each other and they are likely to touch each other, the impact force acting on a pedestrian etc. who collides with the bonnet 52 is reduced by the energy attenuation action accompanying the deformation of the engine cover 10 to improve the safety of the pedestrian etc.

Furthermore, the lightening recesses 20a provided in the fixing parts 14a on the vehicle front side and the lightening recesses 20b provided in the fixing parts 14b on the vehicle back side have mutually different shapes and the deformation stiffness value of the fixing parts 14a is larger than that of the fixing parts 14b. This differentiates the deformation modes between the fixing parts 14a and the fixing parts 14b and the fixing parts 14a, 14b deform in a step-by-step manner to exert the shock-absorbing action owing to the engine cover 10 more effectively, thereby further reducing the load applied to a pedestrian etc. who collided with the bonnet 52.

Moreover, in the present embodiment, the deformation stiffness value of the fixing parts 14a positioned on the front side of the vehicle is made larger than that of the fixing parts 14b positioned on the back side of the vehicle, thereby restricting the deformation amount of the engine cover 10 due to a large load in the initial phase of a collision of a pedestrian or the like from the vehicle front side with the bonnet 52, to a certain extent. This prevents the engine cover 10 from deforming in a momentary large load input due to a collision up to a contact of the cover body 12 with the engine 46, thereby keeping the load applied to a clashed pedestrian etc. low in a stable manner.

One embodiment of the present invention has been described in detail above, but the present invention is not limited to the specific descriptions of the embodiment. For example, the infirm portion is not always limited to one constituted by the lightening recess and it is possible to differentiate the quality or the expansion ratio of the forming material of a portion on the circumference from those of the other portion in the fixing part, thereby providing the infirm portion partially on the periphery. Moreover, it is possible to bond a reinforcing member partially on the periphery of the fixing part to make the portion without the reinforcing member the infirm portion, for example. It is also possible to make the shape of the elastic engaging member 28 vary peripherally to provide the infirm portion on the circumference of the fixing part. In the fixing part having the infirm portion in a structure described above, a flexion deformation in the specific direction which makes the fixing part concave to the side of the infirm portion can arise instead of the bending deformation in the aforementioned embodiment wherein the infirm portions are constituted by the lightening recesses 20a, 20b. When a plurality of fixing parts each have the infirm portion, the structures of the infirm portions each provided on the respective fixing part are not required to be the same and they can be different to each other.

The infirm portion is not always provided alone on the periphery of the fixing part. It is also possible to provide a plurality of infirm portions in order to determine the specific deformation of the fixing part in a load input.

Also, in the case of the infirm portion being constituted by the lightening recess, the shape, the size, the opening direction, the number, or the like of the lightening recess is not especially limited. Additionally, in the case of the lightening recesses being provided in a plurality of fixing parts, the opening direction of the lightening recess provided on each fixing part can be different from each other.

Furthermore, although the lightening recesses 20a, 20b are formed in the middle portions in the protruding direction of the fixing parts 14a, 14b in the above-described embodiment, it is possible to form the lightening recesses on the edges of the fixing parts 14a, 14b on the side of the cover body 12, for example. In this case, a load input upon the cover body 12 compresses the fixing parts 14a, 14b to deform and displace the fixing parts 14a, 14b in the specific direction such that they get tilted relative to the cover body 12. It is also possible to provide the lightening recesses on the edges of the fixing parts 14a, 14b on the side of the engine 46. In such a case, the compression load input deforms and displaces the fixing parts 14a, 14b to tilt them relative to the engine 46.

In the aforementioned embodiment, the structure wherein all fixing parts 14a, 14a, 14b, 14b have the infirm portions is shown as an example. Actually, the present invention requires at least one fixing part to have the infirm portion. For example, it is possible to provide the infirm portions selectively for the fixing parts formed on positions close to the fuel system vehicle parts or the electric system vehicle parts.

The number of the fixing parts 14a, 14b is not limited to four. Moreover, the positions in the cover body 12 where the fixing parts 14a, 14b are formed are not especially limited and they can be formed on arbitrary positions as appropriate.

The specific configurations of the cover body 12 and the fixing parts 14a, 14b in the aforementioned embodiment are only examples and are not especially limited. For example, a plurality of fixing parts can have mutually different shapes with the projection lengths from the cover body 12, the radial dimensions, and the cross-sectional shapes in the axis-perpendicular direction mutually different.

What is claimed is:

1. An engine cover for covering an engine comprising:
a cover body configured to cover the engine from above and configured to be prevented from touching against vehicle parts disposed around the engine; and
at least one fixing part projecting from the cover body toward an engine side and being configured to be attached to the engine side,
wherein:
the cover body and the fixing part are integrally formed of an urethane foam, and the fixing part includes a first fixing part,
the first fixing part has a first infirm portion formed at a periphery thereof,
the first infirm portion comprises a first lightening recess open in a peripheral face of the first fixing part at a part of the periphery of the first fixing part, the first lightening recess including (a) an upper wall inner surface expanding in a horizontal direction orthogonal to an up-down direction of the first fixing part and (b) a circumferential wall inner surface extending downward from the upper wall inner surface, and
the first lightening recess is open toward a side of the first fixing part opposite from a side of the first fixing part closest to the vehicle parts so that the first fixing part is configured to be deformed toward a specific direction where the cover body is prevented from touching against the vehicle parts, due to the first infirm portion, upon input of a load to the cover body.

2. The engine cover according to claim 1, wherein the at least one fixing part further includes a second fixing part, and the second fixing part has a second infirm portion formed at a periphery thereof, the second infirm portion comprising a second lightening recess open in a peripheral face of the second fixing part at a part of the periphery of the second fixing part, the second lightening recess including (a) an upper wall inner surface expanding in a horizontal direction orthogonal to an up-down direction of the second fixing part and (b) a circumferential wall inner surface extending downward from the upper wall inner surface, the second lightening recess being open to a same direction as the first lightening recess of the first fixing part, and the first and second fixing parts are configured to be deformed toward the specific direction.

3. The engine cover according to claim 2, wherein the first and second fixing parts having the respective first and second infirm portions have mutually different deformation stiffness values.

4. The engine cover according to claim 1, wherein the fixing part includes an elastic engaging member bonded thereto and made of urethane elastomers, and the elastic engaging member is configured to be engaged with an engaging element provided on the engine side so that the fixing part is attached to the engine side.

* * * * *